United States Patent [19]

Edahiro et al.

[11] 4,421,539
[45] Dec. 20, 1983

[54] METHOD OF PRODUCING ROD-SHAPED BASE MATERIAL FOR OPTICAL TRANSMISSION FIBER

[75] Inventors: Tadao Edahiro, Tookai; Kazuaki Yoshida; Kunio Ogura, both of Ichihara; Seiji Shibuya; Hiroshi Murata, both of Tokyo, all of Japan

[73] Assignees: Nippon Telegraph & Telephone Public Corporation; The Furukawa Electric Co., Ltd., both of Tokyo, Japan

[21] Appl. No.: 292,676

[22] Filed: Aug. 13, 1981

[30] Foreign Application Priority Data

Aug. 22, 1980 [JP] Japan ................................ 55-115493

[51] Int. Cl.³ .......................................... C03B 37/025
[52] U.S. Cl. ..................................... 65/3.12; 65/18.2; 65/18.4; 65/31; 65/61
[58] Field of Search ...................... 65/3.11, 3.12, 3.15, 65/3.2, 18.2, 18.4, 31, 61

[56] References Cited

U.S. PATENT DOCUMENTS 4,264,347  4/1981  Shintani et al. ...................... 65/3.11

FOREIGN PATENT DOCUMENTS 54-36951  3/1979  Japan .................................. 65/3.15
54-106248  8/1979  Japan .................................. 65/3.12

*Primary Examiner*—Richard V. Fisher
*Attorney, Agent, or Firm*—George B. Oujevolk

[57] ABSTRACT

There is described a method of producing a rod-shaped base material for an optical transmission fiber which has the steps of advantageously measuring the refractive index distribution of the transparent glass rod obtained. The method contemplates heating and sintering the glass soot unit before the step of covering quartz glass material onto the transparent glass rod and removing the outer peripheral part of the transparent glass rod in which the value of the refractive index is largely displaced from a reference in a predetermined range. The rod-shaped base material thus produced exhibits very wide band width transmission characteristics.

3 Claims, 5 Drawing Figures

FIG.1 PRIOR ART FIG.2 PRIOR ART
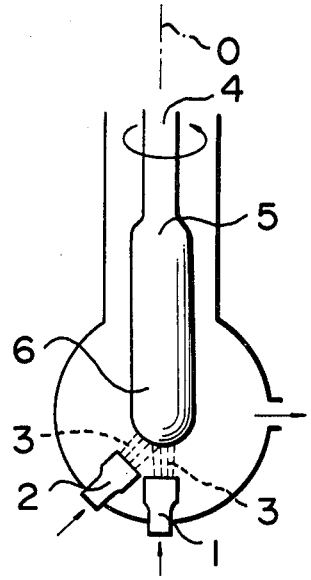
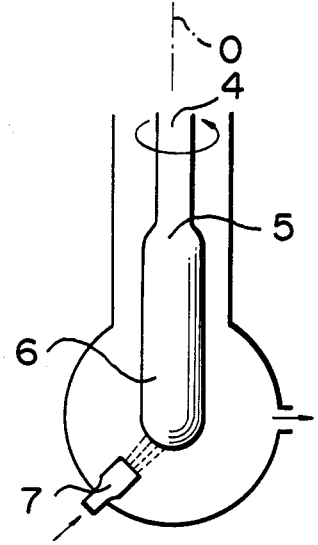
FIG.3 PRIOR ART FIG.4
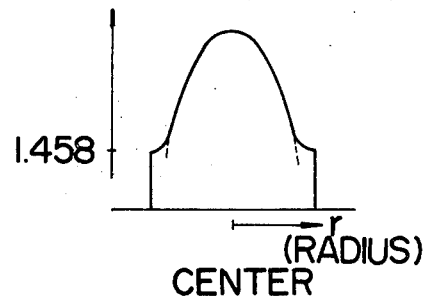
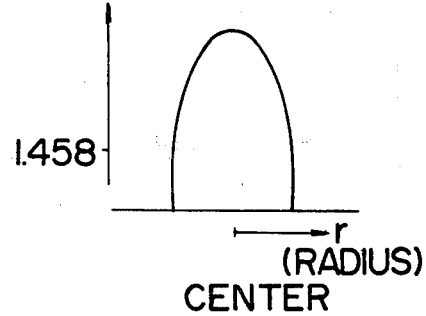
FIG.5
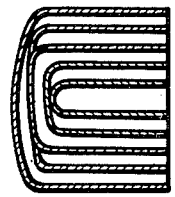

METHOD OF PRODUCING ROD-SHAPED BASE MATERIAL FOR OPTICAL TRANSMISSION FIBER

BACKGROUND OF THE INVENTION

The present invention relates to a method of producing a rod-shaped base material for an optical transmission fiber and, more particularly, to improvements in a method of producing a rod-shaped base material for an optical transmission fiber fabricated by a vapor phase axial deposition process (VAD process) in which the refractive index distribution of a light guide core is of a graded index (GI) type.

An optical transmission or telecommunication fiber used for light transmission or telecommunication having a wide band and low transmission loss was heretofore fabricated by the steps of first forming a rod-shaped base material accommodating a similar cross sectional refractive index distribution to that of an optical transmission fiber by, for example, an internal chemical vapor deposition process (an internal CVD process), an external chemical vapor deposition process (an external CVD process) or a vapor phase axial deposition process (a VAD process) and then thermally spinning the rod-shaped base material thus formed by a spinning machine.

Thus, as shown in FIG. 1, the conventional method includes first, the stop of introducing into a reaction zone SiCl₄ gas capable of becoming optical transmission glass soot by an oxidation reaction and a gas such as GeCl₄ gas, POCl₃ gas or BBr₂ gas capable of becoming a dopant for varying the refractive index of the optical transmission glass and contained in the reaction zone. Also oxy-hydrogen flame burners 1 and 2, are used for reacting these gases. The second step consists of sequentially bonding the glass soot 3 consisting of SiO₂ and GeO₂, P₂O₅ and/or B₂O₃, which is produced towards the end zone 5 of a quartz starting material 4 and thus fabricating a rod-shaped soot-containing glass unit 6 which later becomes a light guide core. The starting material 4 is rotated at a slow rate of speed around the longitudinal cylindrical axis 0 of the reaction vessel. In this case, the rod-shaped glass unit with soot, i.e., the soot-containing glass unit 6 is moved along the axis 0 at the end where the soot 3 is bonded or built up from the burners 1 and 2 and the soot-containing glass unit 6 has a predetermined constant diameter. The burner 1 is disposed coaxially with the axis 0, and the burner 2 is so disposed as to be slightly inclined with respect to the axis 0. The burner 1 forms the glass soot which has a high refractive index and the burner 2 forms the glass soot which has a low refractive index so that the rod-shaped soot-containing glass unit 6 thus formed has a gradually decreasing refractive index from the axial center toward the outer peripheral surface thereof.

The rod-shaped soot-containing glass unit 6 having the foregoing refractive index distribution can be formed similarly with only one burner 7 as indicated in FIG. 2 or with more than three burners by suitably forming the oxy-hydrogen flame temperature and the burner structure.

The conventional method also includes a third step of heat treating the rod-shaped soot-containing glass unit 6 thus formed so that the refractive index is graudally decreased from the central axis toward the outer peripheral surface thereof in a helium gas atmosphere, thereby forming a transparent glass unit in which the refractive index is gradually decreased from the central axis toward the outer peripheral surface. In this step, an OH group increasing the optical transmission loss in the light wave such as a light having a wavelength of the order of 1.39 μm can be removed by prior heat treatment during the second step of forming the transparent glass unit.

The conventional method further includes a fourth step of coating a quartz glass tube having an inner diameter slightly larger than the outer diameter. By this coating step the refractive index is gradually decreased from the central axis toward the outer peripheral surface. There is also a fifth step of heating and softening the quartz glass tube, reducing its diameter so that a rod-shaped base material for an optical transmission fiber in which a quartz glass is covered on a transparent glass unit is formed. In this case, the transparent glass unit may also be covered with a predetermined quartz glass tube after the transparent glass unit is first thermally oriented and is thus formed in a transparent glass unit having a slender shape with a reduced diameter. The outer diameter of the optical transmission fiber and the diameter of the core can be readily controlled by these steps.

The conventional method may have an alternative fourth step instead of the previously described fourth step, of coating quartz glass soot produced by an oxidation reaction in a predetermined thickness on the transparent glass unit, and an alternative fifth step of heating and sintering the glass soot to thereby form a transparent glass, thereby covering the quartz glass on the outer periphery of the transparent unit. The quartz glass thus covered on the outer periphery of the transparent unit serves to mechanically protect the core of the optical transmission fiber formed by thermally spinning the rod-shaped base material for the optical transmission fiber and to further maintain the transmission characteristics for long time. The rod-shaped material for the optical transmission fiber thus produced is formed in an optical transmission fiber having a predetermined diameter by later thermally spinning the base materials with a spinning machine.

Although the rod-shaped base material for an optical transmission fiber thus formed in a grades index (GI) type with the refractive index distribution of the core by the conventional vapor phase axial deposition (VAD) process has heretofore been produced, it is necessary to form the refractive index N(r) of the core of the optical transmission fiber thus formed by thermally spinning the rod-shaped base materials so that the value of α in the following formula becomes "2" in order to increase the band of the optical transmission fiber:

$$N(r) = N_0 \left[ 1 - \Delta \left( \frac{r}{a} \right)^\alpha \right]$$

where $N_0$ represents the refractive index of the central part of the core,

N(r) represents the refractive index of the outer peripheral surface of the core, a represents the radius of the core, α represents $(N_o - N(r))/N_o$, and r represents the distance from the central axis (center).

In order to set the value α of the refractive index of the core of the optical transmission fiber to "2", when forming the rod-shaped glass unit 6 with soot, it is necessary to proper select, the relative position between the burners 1 and 2, the amounts of gases supplied to the respective burners 1 and 2, the relative distance between the respective burners 1, 2 and the end of the soot-containing glass unit 6 of the side to which the glass soot 3 is sequentially bonded, the temperature of the oxy-hydrogen flames of the respective burners 1 and 2, and the structure of the respective burners 1 and 2. However, it was very difficult to set these all values to proper levels. Since the burners 1, 2 are consumable, it was impossible to set the value of α over the entire core in radial direction to "2" because, when the burners 1, 2 are replaced, all the values must be reset to revised values. Actually, the value of α is set to between 18 to 22 for "2", and such rod-shaped glass soot value of α is set in the vicinity of "2" in the central part but the value of α is set largely to a value other than "2" in the peripheral part because of the refractive index distribution of the flared shape which produces a multiple number. Thus, it was impossible to produce an optical transmission fiber with a wide band.

SUMMARY OF THE INVENTION

Accordingly, a primary object of the present invention is to provide a method of producing a rod-shaped base material for an optical transmission fiber which can eliminate the disadvantages and drawbacks of the conventional method and which has a very wide band transmission characteristic.

Another object of the invention is to provide a method of producing a rod-shaped base material for an optical transmission fiber which incorporates an ideal refractive index distribution in the entire core.

Still another object of the invention is to provide a method of producing a rod-shaped base material for an optical transmission fiber which can have an extremely wide band by thermally spinning the resulting rod-shaped base materials.

According to one aspect of the present invention, there is provided a method of producing a rod-shaped base material for an optical transmission fiber which comprises the steps of measuring the refractive index distribution of the transparent glass rod obtained by heating and sintering the glass soot unit before the step of covering the quartz glass material on the transparent glass rod, and removing the outer peripheral part of the transparent glass rod in which the value of α is largely displaced out of the range of "2" when used as an optical transmission fiber of a predetermined thickness.

The foregoing and other related objects and features of the invention will be apparent from a reading of the following description of the disclosure found in the accompanying drawings and the novelty thereof pointed out in the appended claims, in which:

BRIEF DESCRIPTION OF THE DRAWINGS

FIG. 1 is a schematic view showing a general VAD device used in the conventional method;

FIG. 2 is a schematic view similar to FIG. 1 but showing another example of the VAD device;

FIG. 3 is a graphical representation of the refractive index distribution of the core produced according to the VAD device showin in FIGS. 1 and 2;

FIG. 4 is a graphical representation of the refractive index distribution of the core produce according to the method of the present invention; and FIG. 5 is a cross sectional view of the burner opening disclosed for the explanatory purpose of the method of the present invention.

DESCRIPTION OF THE PREFERRED EMBODIMENTS

Reference is made to the drawings, particularly to FIGS. 3 through 5 showing the examples of the refractive index distribution of the transparent glass rod produced according to the VAD process and one example of the preferred burner to be used in connection with the present invention.

As shown in FIG. 3, most of the refractive index distribution of the transparent glass rod produced according to the VAD process incorporates an ideal refractive index distribution from the central axis toward the vicinity of the outer periphery, but the refractive index distribution in the periphery of the transparent glass rod thus produced is formed in a flared shape which is largely different from the ideal refractive index distribution as indicated by broken lines in FIG. 3. According to the present invention, first the outer peripheral part in which the refractive index distribution is largely different from the ideal refractive index distribution is removed by cutting or chemical dissolution as indicated in FIG. 4. The outer peripheral part of the transparent glass rod is normally cut in a thickness more than 30 μm (the outer diameter of the transparent glass rod is approx. 20 mm. in this case). It is preferable to remove the outer peripheral part of the transparent glass rod within 0.15% due to the refractive index (1.458) of the quartz glass material to be covered later, preferably less than 0.1% and more than 0.03% as compared with the refractive index of the molten quartz.

If the thickness of the outer peripheral part thus removed is less than the foregoing value, the outer peripheral part which incorporates largely different refractive index distribution from the ideal refractive index distribution will cause difficulty in producing an optical transmission fiber having a wide band. If the thickness of the outer peripheral part thus removed is more than the foregoing value, there occurs large difference in the refractive index between the outermost peripheral surface of the transparent glass rod removed at the outer periphery and the protecting quartz glass material used as a cover thereon. This causes extreme discontinuity in the refractive index distribution so that it is difficult to produce an optical transmission fiber having wide band.

The method of producing the rod-shaped base material for the optical transmission fiber of the present invention has the steps of first providing a flame polishing step on the transparent glass rod thus removed at the unnecessary outer peripheral part by cutting or chemical dissolution before covering the protecting quartz glass material on the outer periphery so as to smooth the surface. This prevents the enclosure of air in the infinitesimal recesses or cavities formed in cutting or chemical dissolution when covering the quartz glass material thereon. The flame polishing may include a mere oxy-hydrogen flame, but may also be preferably be conducted in an oxy-hydrogen flame in which normal dopant raw material containing Ge, P, B and so forth coexists. This can prevent a change of the refractive index in the outer periphery of the transparent glass rod due to oxy-hydrogen flame polishing.

For the purpose of giving those skilled in the art a better understanding of the invention, the following illustrative examples are given:

EXAMPLE 1

A soot-containing glass unit 6 having a length of 80 cm and a thickness of 50 mm was produced by a VAD device shown in FIG. 2. A burner 7 used in this method had a quintuple tube constructed as indicated in FIG. 5, and the respective tubes supplied a mixture gas of $SiCl_4$ and $GeCl_4$, an $SiCl_4$ gas, an $H_2$ gas, an Ar gas and a $O_2$ gas from the core tube toward the outside tubes. Then, the soot-containing glass unit 6 thus produced was inserted into a cylindrical oven maintained at 1,500° C. at a rate of 200 mm/hr, and a soot-containing glass unit 6 was transformed into a transparent glass rod within the cylindrical oven. In this case, the cylindrical oven was retained with a helium atmosphere containing 4%-$SOCl_2$. Thereafter, the outer peripheral part of the transparent glass rod thus produced was uniformly cut and removed in a thickness of 50 μm. At this time, the refractive index of the outer peripheral surface of the glass rod thus cut was 0.08% higher than that of the molten quartz. Subsequently, the outer periphery of the glass rod thus cut was treated with flame polishing, a protective quartz glass tube prepared separately was covered over the glass rod and was heated to reduce the diameter, and a rod-shaped base material for an optical transmission fiber was thus produced. Then, the rod-shaped base materials thus produced were thermally spinned, and there was thus obtained an optical transmission fiber having an outer diameter of 125 μm and a core diameter of 50 μm. The optical transmission of the optical transmission fiber thus produced transmitted a light wave of 1.31 μm, 0.08 dB/km of loss, and a 6.7 GHzkm of band width.

For comparison, another optical transmission fiber was produced under the same conditions as described except the step of cutting and removing the 50 μm of the outer peripheral part of the glass rod. The optical transmission characteristics of the optical fiber thus produced in this case had 1.2 dB/km of loss and a 0.8 GHzkm band width.

EXAMPLE 2

The transparent glass rod produced in the manner described in Example 1 was dipped in a concentrated fluoric acid water for 40 min., thereby dissolving and removing the outer peripheral part of the glass rod thus produced. In this step, approximately 40 μm of a thickness of the outer peripheral part of the glass rod was removed. The refractive index of the outer peripheral surface of the glass rod thus removed was 0.05% higher than that of the molten quartz (i.e., 1.458). Thereafter, a quartz glass tube was covered over the outer periphery of the glass rod, then heated and reduced in diameter, and thus a rod-shaped base material for an optical transmission fiber was produced. Subsequently, an optical transmission fiber having an outer diameter of 125 μm and a core diameter of 50 μm was produced according to an ordinary process with a prior art spinning machine, after a rod-shaped base material for this optical transmission fiber had been produced accordng to a prior art process. The optical transmission characteristics of the optical transmission fiber thus produced exhibited 0.81 dB/km of loss and 4.3 GHzkm of band width.

Before covering a quartz glass tube on the outer periphery of the transparent glass rod thus produced according to the prior art process, the glass rod was dipped in the fluoric acid water for 5 to 10 min., thereby cleaning the outer peripheral surface of the glass rod.

For comparison, the transparent glass rod thus produced was dipped in a concentrated fluoric acid water for 10 min, thereby cleaning the outer peripheral surface of the glass rod. Approx. 10 μm of a thickness of the outer peripheral part of the glass rod was dissolved and removed with the concentrated fluoric acid water, which was within 0.02% of the outer peripheral part of the glass rod as compared with the refractive index of the molten quartz. A quartz glass material was covered over the same manner as the steps conducted in the previous process on the outer periphery of the glass rod thus cleaned on the outer peripheral surface thereof, and there was thus produced a rod-shaped base material for an optical transmission fiber. Subsequently, an optical transmission fiber having an outer diameter of 125 μm and a core diameter of 50 μm was similarly produced. The optical transmission characteristics of the optical fiber thus produced were: a light wave having a wavelength of 1.31 μm 0.98 dB/km of loss, and 0.95 GHzkm of band width. These characteristics were poorer than those of the optical fiber produced according to the present invention.

When the outer peripheral part of the glass rod obtained by the method in the Example 1 was cut to 0.17% as compared with the refractive index of the molten quartz and an optical transmission fiber was subsequently produced with the glass rod thus obtained in the same manner as described, the optical transmission characteristics of the optical fiber thus produced transmitted a light wave having a wavelength of 1.31 μm 0.83 dB/km of loss and a 0.9 GHzkm band width. These characteristics were poorer than the optical transmission fiber produced according to the present invention.

It should be appreciated from the foregoing description that since the method of producing a rod-shaped base material for an optical transmission fiber having the steps of introducing and causing an oxidation reaction with a gas capable of becoming glass soot for optical transmission, and a gas capable of becoming a dopant for varying the refractive index of the glass, accumulating sequentially longitudinally the glass soot containing the dopant thus produced so as to form a soot containing rod-shaped glass unit having different dopant concentration gradually from the axial center toward the outer peripheral surface thereof, thereafter heating and sintering the glass soot-containing unit produced to form forming a transparent glass rod having a refractive index gradually decreasing from the axial center toward the outer peripheral surface, subsequently covering the outer periphery of the glass rod thus formed with a quartz glass material and then thermally spinning the rod-shaped base material thus formed so as to produce an optical transmission fiber, removing the outer peripheral part of the transparent glass rod thus obtained by heating and sintering the glass soot-containing unit thus formed within a range of 0.15% thereby removing the flared part in the refractive index and subsequently covering the rod with a quartz glass material, the entire core of the rod-shaped base material for the optical transmission fiber thus obtained exhibits an ideal refractive index distribution with the result that the optical transmission fiber obtained by thermally spinning the rod-shaped base materials thus produced provides an article with a very wide band width.

What is claimed is:

1. In a method of producing a rod-shaped base material by a vapor phase axial deposition process, said rod-shaped base material being used as part of an optical transmission fiber, the steps of:
   (a) introducing and reacting into a bulb-shaped reaction zone having a elongated cylindrical portion, a glass soot-forming gas by an oxidation reaction while simultaneously introducing a dopant gas for varying the refractive index of glass;
   (b) longitudinally accumulating soot containing said dopant thus produced thereby forming a soot-containing rod-shaped unit having a different dopant concentration which gradually decreases from the axial center of the produced rod toward the outer peripheral surface thereof;
   (c) thereafter heating and sintering the glass soot-containing unit thus formed at a temperature of the order of 1500° C., so as to produce a transparent glass rod having a refractive index gradually decreasing from the axial center toward the outer peripheral surface thereof;
   (d) removing within a range of 0.15% to 0.03% of the outer peripheral part of the transparent glass rod thus obtained so as to remove a flared part formed by the bulb shape of the reaction zone; and
   (e) covering the outer periphery of the glass rod thus formed with a tubular layer of glass quartz material and then thermally spinning the covered rod-shaped item thus formed so as to produce an optical transmission fiber.

2. The method as claimed in claim 1 wherein the soot-forming gas is $SiCl_4$, and the dopant gas is $GeCl_4$, $POCl_3$, $BBr_2$, and mixtures thereof.

3. The method as claimed in claim 1 wherein the step of covering the quartz glass material over the outer periphery of the transparent glass rod thus removed at the outer peripheral part in a predetermined thickness comprises the steps of covering the glass soot produced by an oxidation reaction on the outer periphery of said glass rod, and thereafter heating and sintering the glass soot thereby forming a transparent glass rod.

* * * * *